United States Patent
Lee (10) Patent No.: US 11,390,462 B2
(45) Date of Patent: Jul. 19, 2022

(54) AUTOMATED TRANSPORTING, STORAGE AND RETRIEVAL SYSTEM AND METHOD USING THE SAME

(71) Applicants: Passion Mobility Ltd., Taipei (TW); Chung Hsin Lee, Las Vegas, NV (US)

(72) Inventor: Chung Hsin Lee, Las Vegas, NV (US)

(73) Assignees: Passion Mobility Ltd., Taipei (TW); Chung Hsin Lee, Las Vegas, NV (US)

( * ) Notice: Subject to any disclaimer, the term of this patent is extended or adjusted under 35 U.S.C. 154(b) by 452 days.

(21) Appl. No.: 16/512,498

(22) Filed: Jul. 16, 2019

(65) Prior Publication Data

US 2021/0016968 A1    Jan. 21, 2021

(51) Int. Cl.

| | |
|---|---|
| *B65G 1/137* | (2006.01) |
| *G05B 19/418* | (2006.01) |
| *G05D 1/02* | (2020.01) |
| *A47F 10/00* | (2006.01) |
| *G06Q 50/28* | (2012.01) |
| *G06Q 10/08* | (2012.01) |
| *G01G 19/40* | (2006.01) |

(52) U.S. Cl.
CPC ............ *B65G 1/1375* (2013.01); *G01G 19/40* (2013.01); *G05B 19/41895* (2013.01); *G05D 1/0274* (2013.01); *G06Q 10/087* (2013.01); *G06Q 50/28* (2013.01); *A47F 2010/005* (2013.01); *G05B 2219/45063* (2013.01); *G05D 2201/0216* (2013.01)

(58) Field of Classification Search
CPC .................. B65G 1/1375; G01G 19/40; G05B 19/41895; G05B 2219/45063; G05D 1/0274; G05D 2201/0216; G06Q 10/087; G06Q 50/28; A47F 2010/005
See application file for complete search history.

(56) References Cited

U.S. PATENT DOCUMENTS

| | | | | |
|---|---|---|---|---|
| 9,327,903 | B2 * | 5/2016 | Toebes | B62D 53/00 |
| 9,802,761 | B2 * | 10/2017 | Buzan | B65G 1/1373 |
| 10,336,543 | B1 * | 7/2019 | Sills | G05D 1/0027 |
| 10,875,174 | B2 * | 12/2020 | Skaaksrud | G05D 1/0282 |
| 11,180,069 | B2 * | 11/2021 | Jarvis | G05D 1/0212 |
| 2020/0283229 | A1 * | 9/2020 | Edwards | H04W 4/38 |

\* cited by examiner

*Primary Examiner* — Ig T An
(74) *Attorney, Agent, or Firm* — Alan D. Kamrath; Karin L. Williams; Mayer & Williams PC (57) ABSTRACT

An automated transporting, storage and retrieval system is provided and includes a control center, and an automated guided mobile unit, a picking spot and a delivery spot in an area; the automated guided mobile unit is connected to the control center; plural storage and retrieval shelves deployed within the area with one of them located on the picking spot containing an inventory item; the control center is configured to: transmit a task command including the inventory item and the delivery spot to the automated guided mobile unit; the automated guided mobile unit is configured to: determine whether it is engaged with the shelf; if yes, the automated guided mobile unit receives the task command and approaches the shelf located on the picking spot to retrieve the inventory item to deliver it to the delivery spot; if no, the automated guided mobile unit approaches one of the shelves and engages therewith.

16 Claims, 8 Drawing Sheets

The automated guided mobile unit approaches the one of the storage and retrieval shelves closest to the automated guided mobile unit by accessing the control center to obtain the distances between the automated guided mobile unit and each of the storage and retrieval shelves

AUTOMATED TRANSPORTING, STORAGE AND RETRIEVAL SYSTEM AND METHOD USING THE SAME

FIELD OF THE INVENTION

The present invention relates to an automated transporting, storage and retrieval system and method utilizing the system, and more particularly to an automated transporting, storage and retrieval system and method applicable to warehouse logistics.

BACKGROUND OF THE INVENTION

Currently, there are mainly two types of auto-transportation systems that can move cargos within a warehouse, auto storage and retrieval systems (AS/RS) and automated guided vehicles (AGV). However, these conventional systems have limitations and drawbacks. For instance, while using conventional auto storage and retrieval systems, cargos stored in a warehouse can only be movable horizontally and vertically along a side of a storage rack and have a transfer mechanism installed thereon for permitting an individual article to be moved into or removed from the storage rack. However, the cargos are only allowed to be moved around the vicinity of the storage rack. If any cargo is needed to be transported away from the storage rack, automated guided vehicles are needed.

Automated guided vehicles are capable of carrying loads and move within a limited area along specific paths programmed by a central control system or the automated guided vehicles themselves. For instance, automated guided vehicles may carry items from one inventory shelf to one another according to a picking order. However, automated guided vehicles are not capable of storing cargos by themselves, they still need to be interoperated with a fixed storage rack in order to move cargos from one location of the rack to one another.

SUMMARY OF THE INVENTION

An aspect of the present invention is to provide an automated transporting, storage and retrieval system comprising a control center; a picking spot and a delivery spot in a geographic area; an automated guided mobile unit wirelessly connected to the control center and adapted to move about the geographic area, wherein the automated guided mobile unit includes a processing unit and a memory unit coupled to the processing unit, the memory unit has coordinates of the geographic area stored therein; a plurality of storage and retrieval shelves deployed within the geographic area, wherein each of the plurality of storage and retrieval shelves is located on the picking spot containing a retrievable inventory item to be picked; wherein the control center is configured to: transmit a task command to the automated guided mobile unit by an radio-frequency unit, and the task command includes the retrievable inventory item and the delivery spot where the retrieved inventory item is to be sent; wherein the automated guided mobile unit is configured to: reference the coordinate of the storage and retrieval shelf which the retrievable inventory item is contained in response to the task command received by accessing the memory unit; determine whether one of the storage and retrieval shelves is docked onto the automated guided mobile unit; in response to determining that the storage and retrieval shelf is docked onto the automated guided mobile unit, the automated guided mobile unit communicates with the control center and sends a packet thereto indicating that the automated guided mobile unit is in an idle mode and is to be receiving the task command, the automated guided mobile unit receives the task command and, according to the task command, approaches the storage and retrieval shelf located on the picking spot containing the retrievable inventory item, the one of the storage and retrieval shelves docked onto the automated guided mobile unit retrieves the retrievable inventory item, and the automated guided mobile unit delivers the retrievable inventory item to the delivery spot; in response to determining that no storage and retrieval shelf is docked onto the automated guided mobile unit, the automated guided mobile unit approaches the one of the storage and retrieval shelves and engages therewith.

According to an embodiment of the automated transporting, storage and retrieval system of the present invention, in which the control center includes a processor, a memory part connected to the processor, and a radio frequency unit connected to the processor and configured to communicate with the automated guided mobile unit, and the memory part contains capacity information and the location of each of the storage and retrieval shelves within the geographic area.

According to an embodiment of the automated transporting, storage and retrieval system of the present invention, in which each of the storage and retrieval shelf has a weight measurement unit configured to measure the weight of the inventory items contained thereby indicating the capacity information thereof, and each of the storage and retrieval shelf transmits the capacity information to be stored in the memory part of the control center on a continuous basis.

According to an embodiment of the automated transporting, storage and retrieval system of the present invention, in which the control center is configured to determine a priority parameter of the storage and retrieval shelves by referring to the distance between the automated guided mobile unit and each of the storage and retrieval shelves, and the capacity information thereof.

According to an embodiment of the automated transporting, storage and retrieval system of the present invention, in which the processing unit of the automated guided mobile unit is configured to access the control center and obtain the priority parameter of the storage and retrieval shelves, and approaches the one of the storage and retrieval shelves according to the priority parameter.

According to an embodiment of the automated transporting, storage and retrieval system of the present invention, in which the processing unit of the automated guided mobile unit is configured to access the control center and obtain the distances between the automated guided mobile unit and each of the storage and retrieval shelves, and approaches the one of the storage and retrieval shelves closest to the automated guided mobile unit.

According to an embodiment of the automated transporting, storage and retrieval system of the present invention, in which each of the storage and retrieval shelves contains an empty space-determining unit configured to determine the empty space capable of loading more inventory items.

According to an embodiment of the automated transporting, storage and retrieval system of the present invention, in which each of the storage and retrieval shelves contains a plurality of loading slots configured to carry inventory items, and the empty space is the number of the empty loading slots.

According to an embodiment of the automated transporting, storage and retrieval system of the present invention, in which in response to determining that none of the storage and retrieval shelf is docked onto the automated guided mobile unit, the automated guided mobile unit approaches the one of the storage and retrieval shelves and communicates therewith to acquire information of the empty space of the one of the storage and retrieval shelf, and in response to determining that the empty space thereof is lower than a predetermined threshold, the automated guided mobile unit travels to approach one another of the storage and retrieval shelf and engages therewith.

According to an embodiment of the automated transporting, storage and retrieval system of the present invention, in which the processing unit of the automated guided mobile unit is configured to communicate with the control center to determine whether the delivery spot has one of the storage and retrieval shelves located thereon, in response to determining that the delivery spot has one of the storage and retrieval shelves located thereon, the automated guided mobile unit approaches the delivery spot and delivers the retrievable inventory item from the storage and retrieval shelf engaged therewith to the storage and retrieval shelf located at the delivery spot, and in response to determining that the delivery spot does not have any of the storage and retrieval shelf located thereon, the automated guided mobile unit reaches the delivery spot and disengage with the storage and retrieval shelf engaged therewith thereby dropping the storage and retrieval shelf at the delivery spot.

Another aspect of the present invention is to provide an automated transporting, storage and retrieval method, comprising: providing a control center capable to transmit a task command; providing a picking spot and a delivery spot in a geographic area; providing an automated guided mobile unit wirelessly connected to the control center and adapted to move about the geographic area, wherein the automated guided mobile unit stores coordinates of the geographic area therein; providing a plurality of storage and retrieval shelves within the geographic area, wherein one of the plurality of storage and retrieval shelves is located on the picking spot containing a retrievable inventory item to be picked; determining, by the automated guided mobile unit, whether one of the storage and retrieval shelves is docked onto the automated guided mobile unit; in response to determining that the storage and retrieval shelf is docked onto the automated guided mobile unit, the automated guided mobile unit communicating with the control center and sending a packet thereto indicating that the automated guided mobile unit is in an idle mode and is to be receiving the task command that includes the retrievable inventory item and the delivery spot where the retrieved inventory item is to be sent, the automated guided mobile unit receiving the task command transmitted from the control center and, according to the task command and by referencing the coordinate of the storage and retrieval shelf which the retrievable inventory item is contained, the automated guided mobile unit approaching the storage and retrieval shelf located on the picking spot containing the retrievable inventory item, having the one of the storage and retrieval shelves engaged with the automated guided mobile unit retrieving the retrievable inventory item, and the automated guided mobile unit delivering the retrievable inventory item to the delivery spot; in response to determining that no storage and retrieval shelf is docked onto the automated guided mobile unit, the automated guided mobile unit approaching the one of the storage and retrieval shelves and engages therewith.

According to an embodiment of the automated transporting, storage and retrieval method of the present invention, further comprising: transmitting, by the control center, capacity information and the location of each of the storage and retrieval shelves within the geographic area; and referencing, by the automated guided mobile unit, the locations of the storage and retrieval shelves with the coordinates, thereby assigning each of the storage and retrieval shelves within the geographic area a specific coordinate.

According to an embodiment of the automated transporting, storage and retrieval method of the present invention, further comprising: measuring, by each of the storage and retrieval shelves, the weight of the inventory items contained therein indicating the capacity information thereof; and transmitting, by each of the storage and retrieval shelves, the capacity information to the control center on a continuous basis.

According to an embodiment of the automated transporting, storage and retrieval method of the present invention, further comprising: determining, by the control center, a priority parameter of the storage and retrieval shelves, wherein the priority parameter is in relation to the distance between the automated guided mobile unit and each of the storage and retrieval shelves, and the capacity information thereof.

According to an embodiment of the automated transporting, storage and retrieval method of the present invention, in which the automated guided mobile unit approaches the one of the storage and retrieval shelves according to the priority parameter by accessing the control center.

According to an embodiment of the automated transporting, storage and retrieval method of the present invention, in which the automated guided mobile unit approaches the one of the storage and retrieval shelves closest to the automated guided mobile unit by accessing the control center to obtain the distances between the automated guided mobile unit and each of the storage and retrieval shelves.

According to an embodiment of the automated transporting, storage and retrieval method of the present invention, further comprising: determining, by each of the storage and retrieval shelves, an empty space capable of loading additional inventory items.

According to an embodiment of the automated transporting, storage and retrieval method of the present invention, in which each of the storage and retrieval shelves contains a plurality of loading slots capable of carrying inventory items, and the empty space is the number of the empty loading slots.

According to an embodiment of the automated transporting, storage and retrieval method of the present invention, further comprising: in response to determining that none of the storage and retrieval shelf is docked onto the automated guided mobile unit, the automated guided mobile unit approaching the one of the storage and retrieval shelves and communicates therewith to acquire information of the empty space of the one of the storage and retrieval shelf; and in response to determining that the empty space thereof is lower than a predetermined threshold, the automated guided mobile unit approaching one another of the storage and retrieval shelf and engages therewith.

According to an embodiment of the automated transporting, storage and retrieval method of the present invention, further comprising: communicating, by the automated guided mobile unit, with the control center to determine whether the delivery spot has one of the storage and retrieval shelves located thereon; in response to determining that the delivery spot has one of the storage and retrieval shelves located thereon, the automated guided mobile unit approaching the delivery spot and delivering the retrievable inventory item from the storage and retrieval shelf engaged therewith to the storage and retrieval shelf located at the delivery spot; and in response to determining that the delivery spot does not have any of the storage and retrieval shelf located thereon, the automated guided mobile unit reaching the delivery spot and disengage with the storage and retrieval shelf engaged therewith thereby dropping the storage and retrieval shelf at the delivery spot.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method or the system by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that when an element is referred to as being "connected" to another element, it can be directly connected to the other element or intervening elements may be present.

Figure 1:
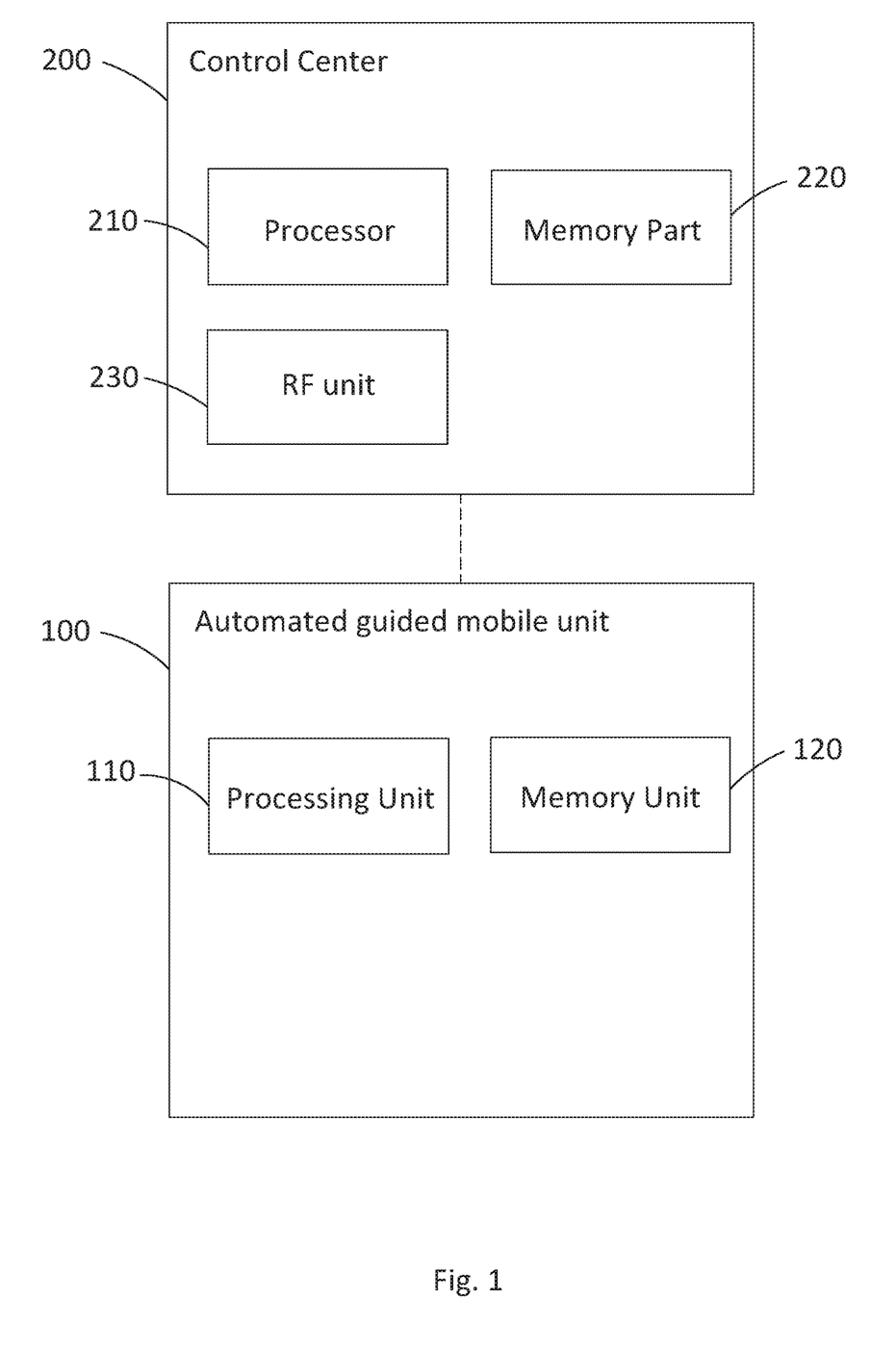
FIG. 1 is a schematic diagram illustrating control center connected with an automated guided mobile unit of an automated transporting, storage and retrieval system according to an embodiment of the present invention.
Figure 2:
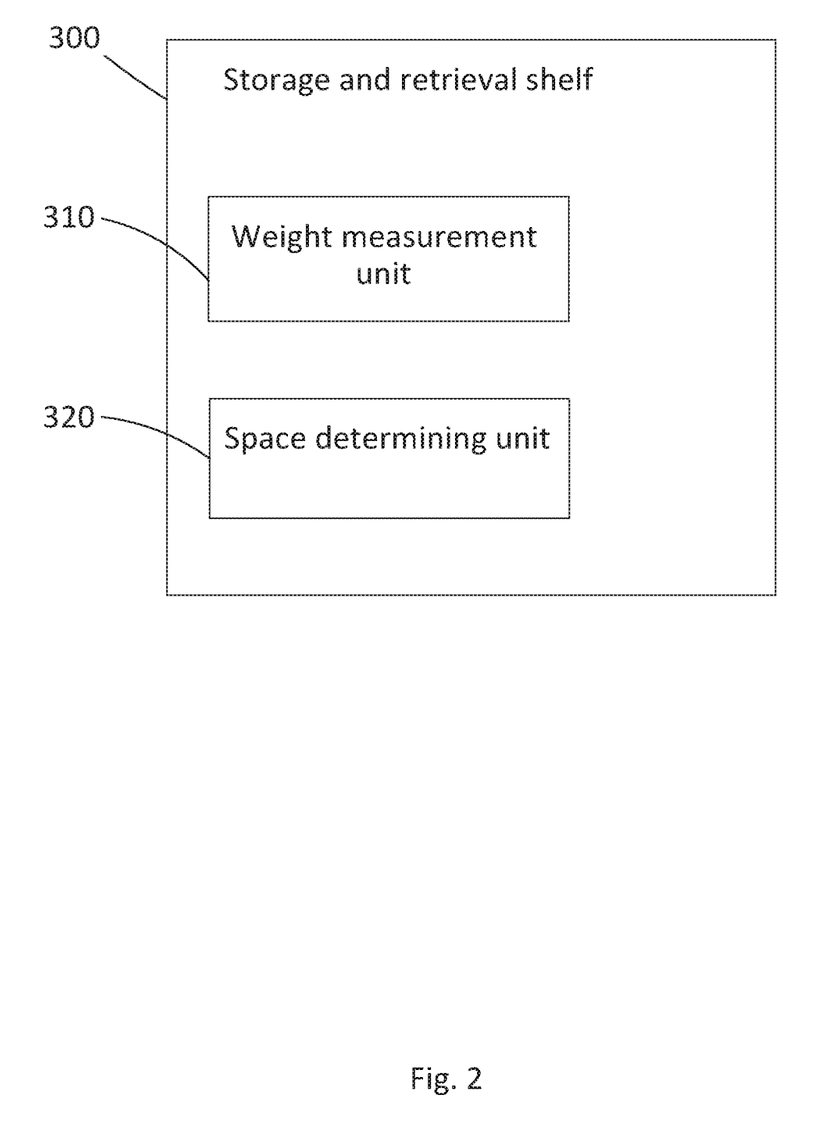
FIG. 2 is a schematic diagram illustrating a storage and retrieval shelf of the automated transporting, storage and retrieval system according to an embodiment of the present invention.
Figure 3A:
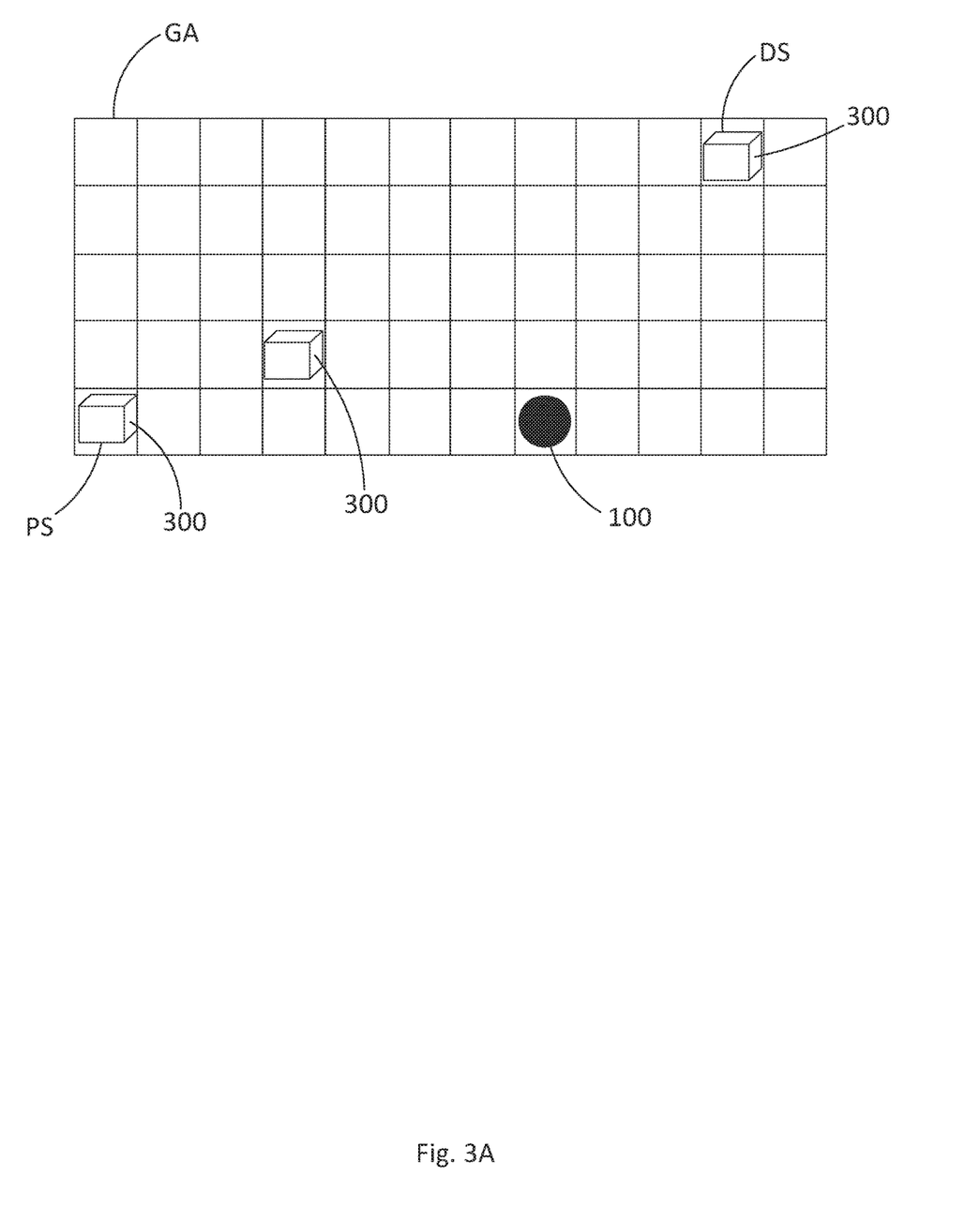
FIG. 3A is a schematic diagram illustrating a geographic area and the relevant locations of the automated guided mobile unit and the storage and retrieval shelves of the automated transporting, storage and retrieval system with one of them located at a delivery spot according to an embodiment of the present invention.
Figure 3B:
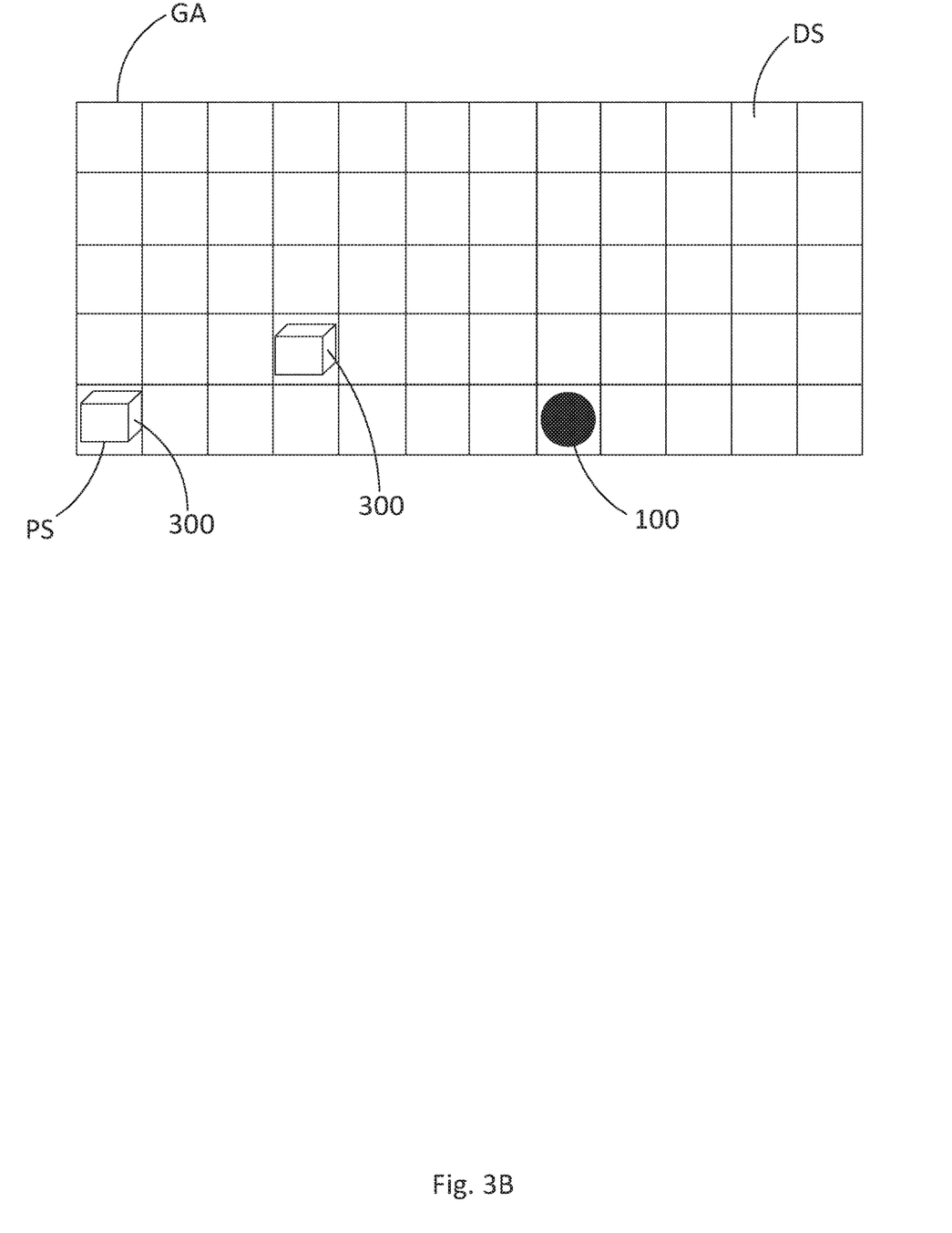
FIG. 3B is a schematic diagram illustrating a geographic area and the relevant locations of the automated guided mobile unit and the storage and retrieval shelves of the automated transporting, storage and retrieval system with none of them located at the delivery spot according to an embodiment of the present invention.
Figure 3C:
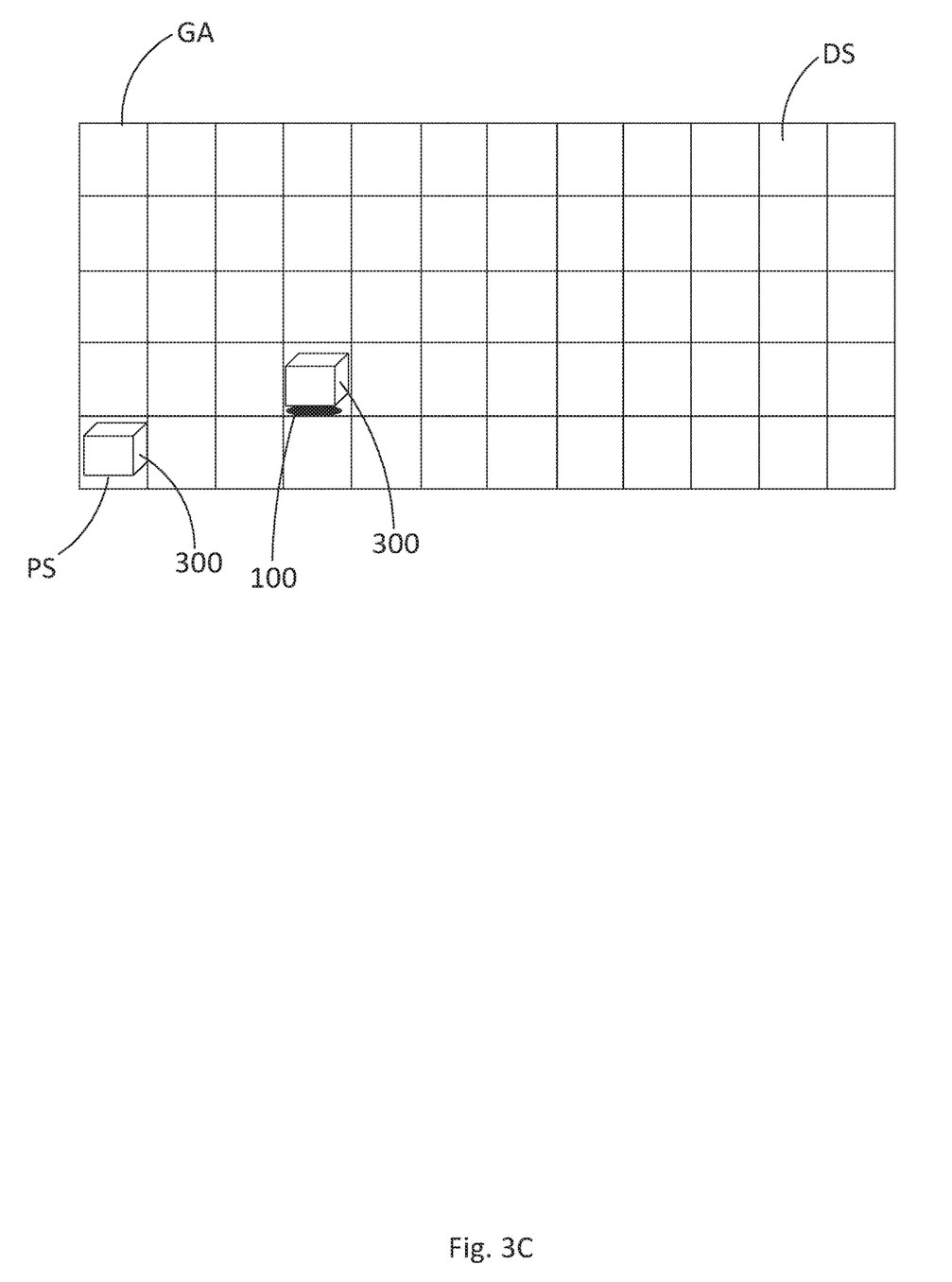
FIG. 3C is a schematic diagram illustrating a geographic area and the relevant locations of the automated guided mobile unit and the storage and retrieval shelves of the automated transporting, storage and retrieval system with one of them engaged with the automated guided mobile unit according to an embodiment of the present invention.

Referring to FIG. 1 to FIG. 3A to 3C, in which FIG. 1 is a schematic diagram illustrating control center 200 and an automated guided mobile unit 100 of an automated transporting, storage and retrieval system according to an embodiment of the present invention, FIG. 2 is a schematic diagram illustrating a storage and retrieval shelf 300 of the automated transporting, storage and retrieval system according to an embodiment of the present invention, and FIG. 3A to 3C are schematic diagram illustrating a geographic area GA and the relevant locations of the automated guided mobile unit 100 and the storage and retrieval shelves 300 of the automated transporting, storage and retrieval system according to an embodiment of the present invention. The automated transporting, storage and retrieval system includes the automated guided mobile unit 100, the control center 200, the storage and retrieval shelf 300 and the geographic area GA where the system is being used, in which the automated guided mobile unit 100 is to move within the geographic area GA, and the storage and retrieval shelf 300 is located within the geographic area; the storage and retrieval shelf 300 is plural. The geographic area GA includes a picking spot PS and a delivery spot DS, and one of the storage and retrieval shelves 300 is located on the picking spot PS and contains a retrievable inventory item to be picked and delivered to the delivery spot DS. The automated guided mobile unit 100 is wirelessly connected to the control center 200 and includes a processing unit 110 and a memory unit 120 coupled to the processing unit 110, in which the memory unit 120 contains coordinates of the geographical area GA. The control center 200 includes a processor 210, a memory part 220 connected to the processor 210, and a radio frequency unit 230 connected to the processor 210 as well. The memory part 220 of the control center also contains capacity information and the location of each of the storage and retrieval shelves 300 within the geographic area GA. The control center 200 is configured to communicate with, and transmit packets to the automated guided mobile unit 100 via the radio frequency unit 130. The control center 200 is operated to determine a priority parameter in connection with the storage and retrieval shelves 300 by referring to the capacity information and the distances between the automated guided mobile unit 100 and each of the storage and retrieval shelves 300. For instance, the more the capacity the storage and retrieval shelf 300 has, and the less the distance between such storage and retrieval shelf 300 and the automated guided mobile unit 100 is, the higher score of the priority parameter of such storage and retrieval shelf 300 would be. In regard with the capacity information, it may be a net weight information of the inventory items loaded on the storage and retrieval shelf 300, in which such net weight information may be calculated by the control center 200 by referencing the total weight of the storage and retrieval shelf 300 and the inventory items loaded on the storage and retrieval shelf 300, and the weight of the storage and retrieval shelf 300 itself. The weight of the storage and retrieval shelf 300 can be saved in the control center 200. Additionally, the weight of the inventory items contained can be obtained by using a weight measuring unit 310 of each of the storage and retrieval shelves 300, and transmitted to the control center 200 on a continuous basis. Besides, each of the storage and retrieval shelf 300 contains an empty space determining unit 320 configured to determine the empty space of the storage and retrieval shelf 300 that is capable of containing more inventory items. For instance, the storage and retrieval shelf 300 may includes a number of loading slots, and the inventory items can be contained in the loading slots. The empty space, for instance, may be the number of the loading slots that are empty, and those can be done by using RFID tags.

The control center 200 is configured to transmit a task command to the automated guided mobile unit 100 via the radio frequency unit 230, and the task command includes a retrievable inventory item and the delivery spot DS where the retrieved inventory item is to be sent.

The automated guided mobile unit 100 is configured to reference the coordinate of the storage and retrieval shelf 300 which the retrievable inventory item is contained with the task command received, and to determine whether one of the storage and retrieval shelves 300 is docked onto the automated guided mobile unit 100.

In response to determining that one of the storage and retrieval shelves 300 is docked onto the automated guided mobile unit 100, the automated guided mobile unit 100 is configured to communicate with the control center 200 and sends a packet to the control center 200 indicating that the automated guided mobile unit 100 is in an idle mode and is ready to carry inventory items, and that it is ready to receive the task command. The automated guided mobile unit 100 may then receive the task command from the control center 220 and, according to the task command, approaches the storage and retrieval shelf 300 located on the picking spot PS containing a retrievable inventory item, so that the storage and retrieval shelf 300 docked onto the automated guided mobile unit 100, engaged with the storage and retrieval shelf 300, may then approach the storage and retrieval shelf 300 located at the picking spot PS and retrieves the retrievable inventory item by an extending mechanism such as a robotic arm, and delivers the retrievable inventory item to the delivery spot DS.

In response to determining that none of the storage and retrieval shelves 300 is docked onto the automated guided mobile unit 100, the processing unit 110 of the automated guided mobile unit 100 is configured to access the control center 200 and obtain the priority parameter of the storage and retrieval shelves 300, and approach the one of the storage and retrieval shelves 300 according to the priority parameter (highest score). Alternatively, in some embodiments, the processing unit 110 of the automated guided mobile unit 100 is configured to access the control center 200 to obtain the distances between the automated guided mobile unit 10 and each of the storage and retrieval shelves 300, and approach to engage one of the storage and retrieval shelves 300 that is closest to the automated guided mobile unit 100. Besides, the automated guided mobile unit 100 may also approach and communicate with the storage and retrieval shelf 300 according to the priority parameter or the distance therebetween to acquire information of the empty space of such storage and retrieval shelf 300, and in response to determining that the empty space of such storage and retrieval shelf 300 is lower than a predetermined threshold, the automated guided mobile unit 100 travels to approach one another of the storage and retrieval shelves 300 that has the second highest score of the priority parameter for engagement to avoid engaging with one of the storage and retrieval shelves 300 that does not have much space to carry inventory items even if the capacity information of such storage and retrieval shelf 300 has not yet reached its weight limit.

It is worth mentioning that the processing unit 110 of the automated guided mobile unit is configured to communicate with the control center 200 to determine whether the delivery spot DS has one of the storage and retrieval shelves 300 occupying the delivery spot DS, in response to determining that the delivery spot DS has been occupied by one of the storage and retrieval shelves 300, the automated guided mobile unit 100 is configured to approach the delivery spot DS and delivers the retrievable inventory item from the storage and retrieval shelf 300 engaged with the automated guided mobile unit 100 to the storage and retrieval shelf 300 occupying the delivery spot DS, and in response to determining that the delivery spot DS is not occupied by any of the storage and retrieval shelf 300 located, the automated guided mobile unit 100 is configured to reach the delivery spot DS and disengage the storage and retrieval shelf 300 engaged with the automated guided mobile unit 100 to drop the storage and retrieval shelf 300 at the delivery spot DS to fulfill the task command.

Figure 4:
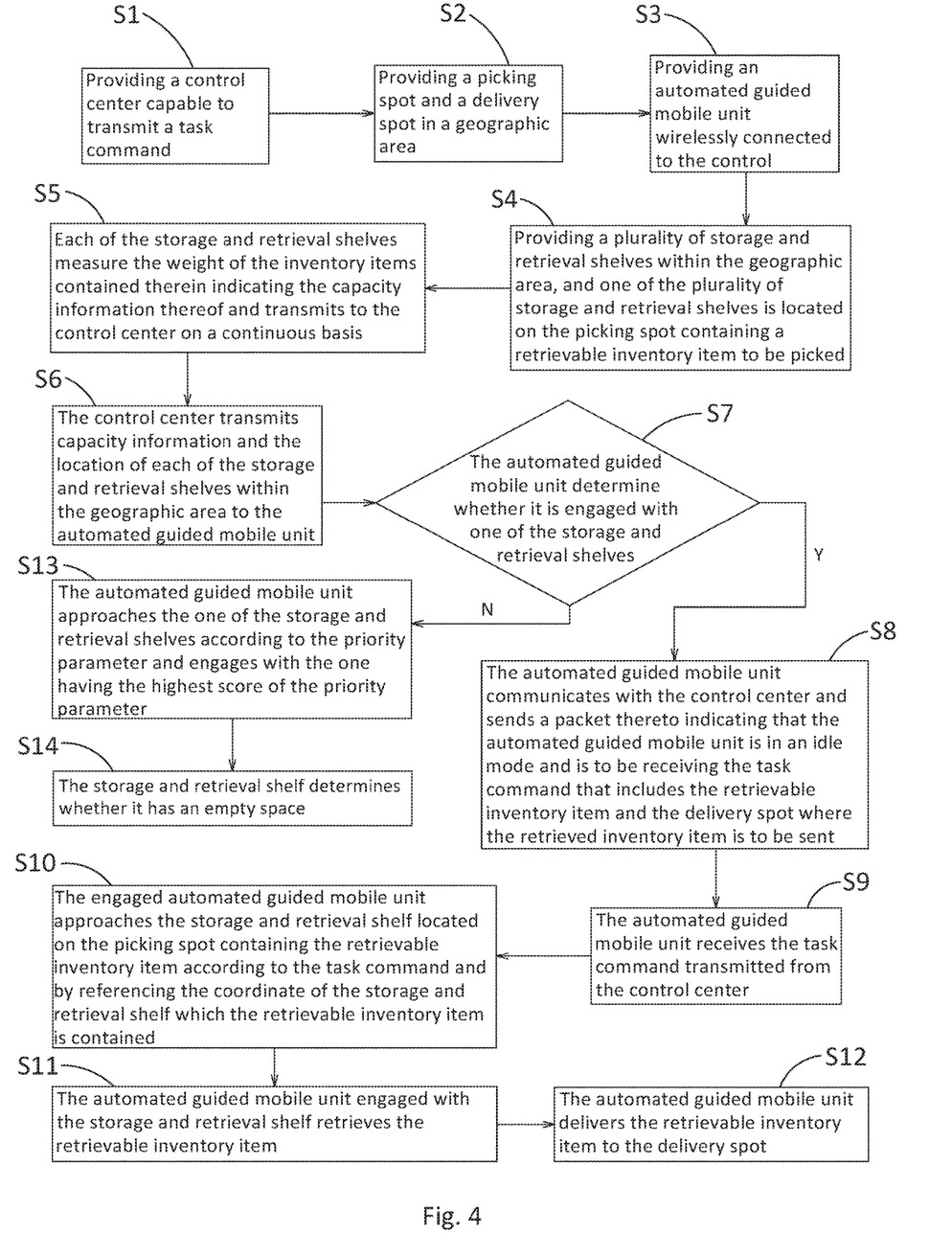
FIG. 4 is a flow chart illustrating a method utilizing the automated transporting, storage and retrieval system according to an embodiment of the present invention.

Referring to FIG. 3A to 3C and FIG. 4, where FIG. 4 is a flow chart illustrating a method utilizing the automated transporting, storage and retrieval system according to an embodiment of the present invention, and the method includes the following steps:

Step S1, providing the control center 200 capable to transmit the task command;

Step S2, providing a picking spot PS and a delivery spot DS in the geographic area GA;

Step S3, providing the automated guided mobile unit 100 wirelessly connected to the control center 200 and adapted to move about the geographic area GA, where the automated guided mobile unit 100 stores coordinates of the geographic area GA;

Step S4, providing the storage and retrieval shelves 300 within the geographic area GA, wherein one of the storage and retrieval shelves 300 is located on the picking spot PS containing the retrievable inventory item to be picked, and referencing, by the automated guided mobile unit 100, the locations of the storage and retrieval shelves 300 obtained from the control center 200 with the coordinate of the geographic area GA, thereby assigning each of the storage and retrieval shelves 300 within the geographic area GA a specific coordinate;

Step S5, measuring, by each of the storage and retrieval shelves 300, the weight of the inventory items contained indicating the capacity information;

Step S6, transmitting, by each of the storage and retrieval shelves 300, the capacity information to the control center 200 on a continuous basis, and the control center then transmits such capacity information and the location of each of the storage and retrieval shelves 300 within the geographic area GA to the automated guided mobile unit 100;

Step S7, determining, by the automated guided mobile unit, whether one of the storage and retrieval shelves 300 is docked onto the automated guided mobile unit 100, and in response to determining that one of the storage and retrieval shelves 300 is docked onto the automated guided mobile unit 100 (see FIG. 3C), step S8 is performed that the automated guided mobile unit 100 communicates with the control center 200 and sends to the control center 200 a packet indicating that the automated guided mobile unit 100 is in an idle mode and is allowed to receive the task command that includes the retrievable inventory item and the delivery spot DS where the retrievable inventory item is to be sent. Step S9, the automated guided mobile unit 100 receives the task command transmitted from the control center 200, and step S10, according to the task command and by referencing the coordinate of the storage and retrieval shelf 300 which the retrievable inventory item is contained, the automated guided mobile unit 100 approaches such storage and retrieval shelf 300 located on the picking spot PS which contains the retrievable inventory item. Next, step S11, the storage and retrieval shelf 300 engaged with the automated guided mobile unit 100 then retrieves the retrievable inventory item from the storage and retrieval shelf 300 located at the picking spot PS containing the retrievable inventory item, and finally, in step S12, the automated guided mobile unit 100 delivers the retrievable inventory item to the delivery spot DS.

In response to determining that none of the storage and retrieval shelves 300 is docked onto the automated guided mobile unit 100 (see FIGS. 3A and 3B), step S13 is performed, in which the automated guided mobile unit 100 approaches one of the storage and retrieval shelves 300 according to a few factors, firstly, the automated guided mobile unit 100 approaches one of the storage and retrieval shelves 300 according to the priority parameter, determined by the control center 200, that is in relation to the distances between the automated guided mobile unit 300 and each of the storage and retrieval shelves 300 and their capacity information, that is, for instance, the more the capacity the storage and retrieval shelf 300 has, and the less the distance between such storage and retrieval shelf 300 and the automated guided mobile unit 100 is, the higher score of the priority parameter of such storage and retrieval shelf 300 would be. The automated guided mobile unit 100 will then choose to approach the storage and retrieval shelf 300 that has the highest score. Meanwhile, while the automated guided mobile unit 100 has approached one of the storage and retrieval shelves 300, optionally, step S14 may be performed, in which the storage and retrieval shelf 300 determines the empty space capable of loading additional inventory items, where the empty space is the number of the empty loading slots, and in response to determining that the empty space is lower than a predetermined threshold, for instance, 10% (meaning that that storage and retrieval shelf 300 is 90% full), the automated guided mobile unit 100 may approach one another of the storage and retrieval shelf to conduct engagement, for instance, the storage and retrieval shelf 300 that has the second highest score. While the automated guided mobile unit 100 has been docked, engaged, with the storage and retrieval shelf 300, step S6 may then be performed afterwards.

Figure 5:
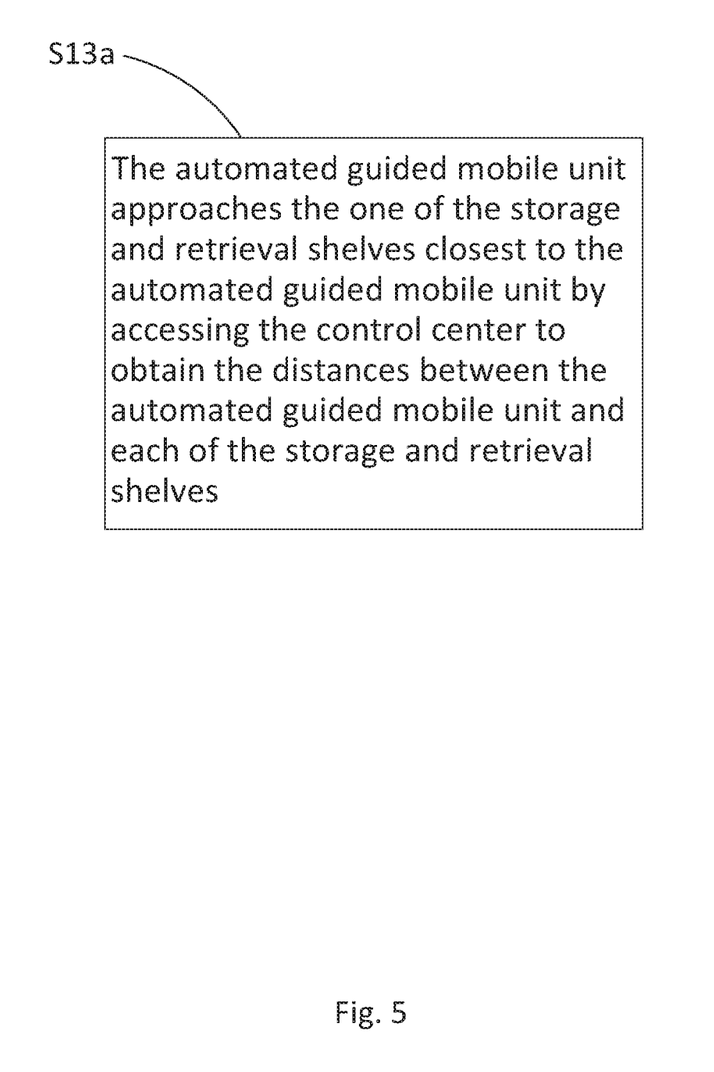
FIG. 5 is a flow chart illustrating an alternative step of the method utilizing the automated transporting, storage and retrieval system according to an embodiment of the present invention.

It is worth mentioning that, as shown in FIG. 5, alternatively, in some embodiments, the automated guided mobile unit 100 may access the control center 200 to obtain the distances between the automated guided mobile unit 10 and each of the storage and retrieval shelves 300, so as to approach to engage one of the storage and retrieval shelves 300 that is closest to the automated guided mobile unit 100 instead of referring to the priority parameter (step S13a).

Figure 6:
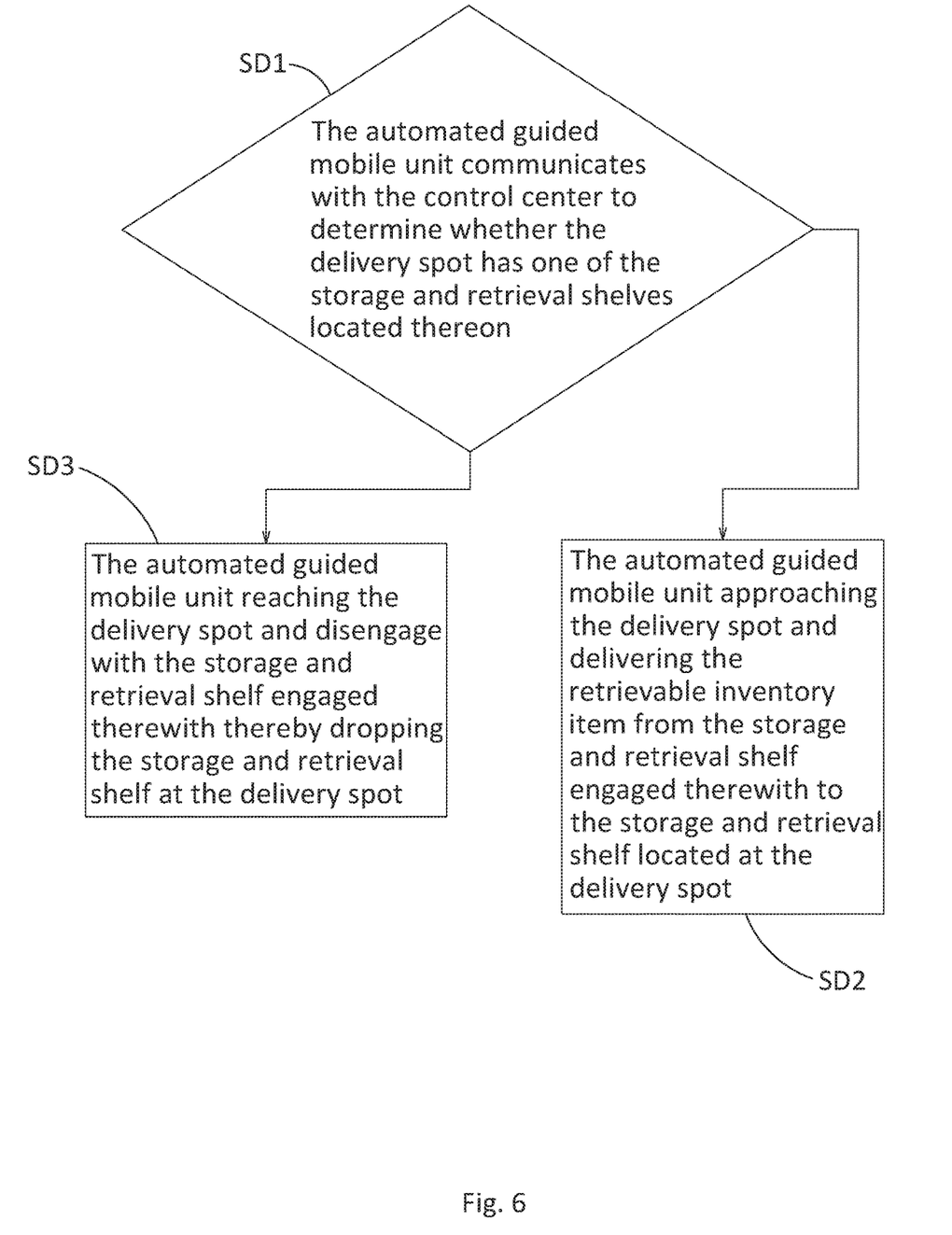
FIG. 6 is a flow chart illustrating optional steps of the method utilizing the automated transporting, storage and retrieval system according to an embodiment of the present invention.

In addition, the automated guided mobile unit 100 may also communicate with the control center 200 to determine whether the delivery spot DS has one of the storage and retrieval shelves 300 located at the delivery spot DS (step SD1). In response to determining that the delivery spot DS has one of the storage and retrieval shelves 300 located at the delivery spot DS, step SD2 is performed, in which the automated guided mobile unit 100 approaches the delivery spot DS and delivers the retrievable inventory item from the storage and retrieval shelf 300 engaged with the automated guided mobile unit 100, to the storage and retrieval shelf 300 located at the delivery spot. For instance, the storage and retrieval shelf 300 may contain a robotic arm, and the robotic arm grabs the retrievable inventory item from the storage and retrieval shelf 300 engaged with the automated guided mobile unit 100, to the storage and retrieval shelf 300 located at the delivery spot. In response to determining that the delivery spot DS does not have any of the storage and retrieval shelf 300 located, step SD3 is performed, in which the automated guided mobile unit 100 reaches the delivery spot DS and disengage with the storage and retrieval shelf 300 engaged with the automated guided mobile unit 100, so as to drop the storage and retrieval shelf 300 at the delivery spot DS.

By using the automated transporting, storage and retrieval system of the present invention, warehouse no longer need to have a huge storage rack built therein, the storage and retrieval shelf 300 of the present invention may be moved about a geographic area in a warehouse by being docked on an automated guided mobile unit, so as to bring flexibility of the space in a warehouse, because each storage unit, i.e. the storage and retrieval shelves of the present invention, can be movable. In addition, the automated guided mobile unit 100 of the present invention needs not to receive task prior to having one of the storage and retrieval shelves 300 docked thereon, thereby reducing the workload of the control center 200, and only request for task commands if it has been engaged with one of the storage and retrieval shelves 300 and frequently communicates with the control center thereafter.

The description of the invention including its applications and advantages as set forth herein is illustrative and is not intended to limit the scope of the invention, which is set forth in the claims Variations and modifications of the embodiments disclosed herein are possible, and practical alternatives to and equivalents of the various elements of the embodiments would be understood to those of ordinary skill in the art upon study of this patent document. For example, specific values given herein are illustrative unless identified as being otherwise, and may be varied as a matter of design consideration. Terms such as "target" and "background" or so are distinguishing terms and are not to be construed to imply an order or a specific part of the whole. These and other variations and modifications of the embodiments disclosed herein, including of the alternatives and equivalents of the various elements of the embodiments, may be made without departing from the scope and spirit of the invention, including the invention as set forth in the following claims

What is claimed is:

1. An automated transporting, storage and retrieval system, comprising:
a control center;
a picking spot and a delivery spot in a geographic area;
an automated guided mobile unit wirelessly connected to the control center and adapted to move about the geographic area, wherein the automated guided mobile unit includes a processing unit and a memory unit coupled to the processing unit, the memory unit has coordinates of the geographic area stored therein;
a plurality of storage and retrieval shelves deployed within the geographic area, wherein one of the plurality of storage and retrieval shelves is located on the picking spot containing a retrievable inventory item to be picked;

wherein the control center is configured to:
transmit a task command to the automated guided mobile unit by an radio frequency unit, and the task command includes the retrievable inventory item and the delivery spot where the retrieved inventory item is to be sent;

wherein the automated guided mobile unit is configured to:

reference the coordinate of the storage and retrieval shelf which the retrievable inventory item is contained with the task command received by interoperating with the memory unit;

determine whether one of the storage and retrieval shelves is docked onto the automated guided mobile unit;

in response to determining that the storage and retrieval shelf is docked onto the automated guided mobile unit, the automated guided mobile unit communicates with the control center and sends a packet thereto indicating that the automated guided mobile unit is in an idle mode and is to be receiving the task command, the automated guided mobile unit receives the task command and, according to the task command, approaches the storage and retrieval shelf located on the picking spot containing the retrievable inventory item, the one of the storage and retrieval shelves docked onto the automated guided mobile unit retrieves the retrievable inventory item, and the automated guided mobile unit delivers the retrievable inventory item to the delivery spot;

in response to determining that no storage and retrieval shelf is docked onto the automated guided mobile unit, the automated guided mobile unit approaches the one of the storage and retrieval shelves and engages therewith;

wherein each of the storage and retrieval shelves contains an empty space determining unit configured to determine the empty space capable of loading more inventory items; and in response to determining that none of the storage and retrieval shelf is docked onto the automated guided mobile unit, the automated guided mobile unit approaches the one of the storage and retrieval shelves and communicates therewith to acquire information of the empty space of the one of the storage and retrieval shelf, and in response to determining that the empty space thereof is lower than a predetermined threshold, the automated guided mobile unit travels to approach one another of the storage and retrieval shelf and engages therewith.

2. The automated transporting, storage and retrieval system as claimed in claim 1, wherein the control center includes a processor, a memory part connected to the processor, and a radio frequency unit connected to the processor and configured to communicate with the automated guided mobile unit, and the memory part contains capacity information and the location of each of the storage and retrieval shelves within the geographic area.

3. The automated transporting, storage and retrieval system as claimed in claim 2, wherein each of the storage and retrieval shelf has a weight measurement unit configured to measure the weight of the inventory items contained thereby indicating the capacity information thereof, and each of the storage and retrieval shelf transmits the capacity information to be stored in the memory part of the control center on a continuous basis.

4. The automated transporting, storage and retrieval system as claimed in claim 3, wherein the control center is configured to determine a priority parameter of the storage and retrieval shelves by referring to the distance between the automated guided mobile unit and each of the storage and retrieval shelves, and the capacity information thereof.

5. The automated transporting, storage and retrieval system as claimed in claim 4, wherein the processing unit of the automated guided mobile unit is configured to access the control center and obtain the priority parameter of the storage and retrieval shelves, and approaches the one of the storage and retrieval shelves according to the priority parameter.

6. The automated transporting, storage and retrieval system as claimed in claim 4, wherein the processing unit of the automated guided mobile unit is configured to access the control center and obtain the distances between the automated guided mobile unit and each of the storage and retrieval shelves, and approaches the one of the storage and retrieval shelves closest to the automated guided mobile unit.

7. The automated transporting, storage and retrieval system as claimed in claim 1, wherein each of the storage and retrieval shelves contains a plurality of loading slots configured to carry inventory items, and the empty space is the number of the empty loading slots.

8. The automated transporting, storage and retrieval system as claimed in claim 1, wherein the processing unit of the automated guided mobile unit is configured to communicate with the control center to determine whether the delivery spot has one of the storage and retrieval shelves located thereon, in response to determining that the delivery spot has one of the storage and retrieval shelves located thereon, the automated guided mobile unit approaches the delivery spot and delivers the retrievable inventory item from the storage and retrieval shelf engaged therewith to the storage and retrieval shelf located at the delivery spot, and in response to determining that the delivery spot does not have any of the storage and retrieval shelf located thereon, the automated guided mobile unit reaches the delivery spot and disengage with the storage and retrieval shelf engaged therewith thereby dropping the storage and retrieval shelf at the delivery spot.

9. An automated transporting, storage and retrieval method, comprising:
providing a control center capable to transmit a task command;
providing a picking spot and a delivery spot in a geographic area;
providing an automated guided mobile unit wirelessly connected to the control center and adapted to move about the geographic area, wherein the automated guided mobile unit stores coordinates of the geographic area therein;
providing a plurality of storage and retrieval shelves within the geographic area, wherein one of the plurality of storage and retrieval shelves is located on the picking spot containing a retrievable inventory item to be picked;
determining, by the automated guided mobile unit, whether one of the storage and retrieval shelves is docked onto the automated guided mobile unit;
in response to determining that the storage and retrieval shelf is docked onto the automated guided mobile unit, the automated guided mobile unit communicating with the control center and sending a packet thereto indicating that the automated guided mobile unit is in an idle mode and is to be receiving the task command that includes the retrievable inventory item and the delivery spot where the retrieved inventory item is to be sent, the automated guided mobile unit receiving the task command transmitted from the control center and, according to the task command and by referencing the coordinate of the storage and retrieval shelf which the retrievable inventory item is contained, the automated guided mobile unit approaching the storage and retrieval shelf located on the picking spot containing the retrievable inventory item, having the one of the storage and retrieval shelves engaged with the automated guided mobile unit retrieving the retrievable inventory item, and the automated guided mobile unit delivering the retrievable inventory item to the delivery spot;

in response to determining that none of the storage and retrieval shelf is docked onto the automated guided mobile unit, the automated guided mobile unit approaching the one of the storage and retrieval shelves and engages therewith;

determining, by each of the storage and retrieval shelves, an empty space capable of loading additional inventory items;

in response to determining that none of the storage and retrieval shelf is docked onto the automated guided mobile unit, the automated guided mobile unit approaching the one of the storage and retrieval shelves and communicates therewith to acquire information of the empty space of the one of the storage and retrieval shelf; and in response to determining that the empty space thereof is lower than a predetermined threshold, the automated guided mobile unit approaching one another of the storage and retrieval shelf and engages therewith.

10. The automated transporting, storage and retrieval method as claimed in claim 9, further comprising:

transmitting, by the control center, capacity information and the location of each of the storage and retrieval shelves within the geographic area; and referencing, by the automated guided mobile unit, the locations of the storage and retrieval shelves with the coordinates, thereby assigning each of the storage and retrieval shelves within the geographic area a specific coordinate.

11. The automated transporting, storage and retrieval method as claimed in claim 10, further comprising:

measuring, by each of the storage and retrieval shelves, the weight of the inventory items contained therein indicating the capacity information thereof; and transmitting, by each of the storage and retrieval shelves, the capacity information to the control center on a continuous basis.

12. The automated transporting, storage and retrieval method as claimed in claim 11, further comprising:

determining, by the control center, a priority parameter of the storage and retrieval shelves, wherein the priority parameter is in relation to the distance between the automated guided mobile unit and each of the storage and retrieval shelves, and the capacity information thereof.

13. The automated transporting, storage and retrieval method as claimed in claim 12, wherein the automated guided mobile unit approaches the one of the storage and retrieval shelves according to the priority parameter by accessing the control center.

14. The automated transporting, storage and retrieval method as claimed in claim 12, wherein the automated guided mobile unit approaches the one of the storage and retrieval shelves closest to the automated guided mobile unit by accessing the control center to obtain the distances between the automated guided mobile unit and each of the storage and retrieval shelves.

15. The automated transporting, storage and retrieval method as claimed in claim 9, wherein each of the storage and retrieval shelves contains a plurality of loading slots capable of carrying inventory items, and the empty space is the number of the empty loading slots.

16. The automated transporting, storage and retrieval method as claimed in claim 1, further comprising:

communicating, by the automated guided mobile unit, with the control center to determine whether the delivery spot has one of the storage and retrieval shelves located thereon;

in response to determining that the delivery spot has one of the storage and retrieval shelves located thereon, the automated guided mobile unit approaching the delivery spot and delivering the retrievable inventory item from the storage and retrieval shelf engaged therewith to the storage and retrieval shelf located at the delivery spot; and in response to determining that the delivery spot does not have any of the storage and retrieval shelf located thereon, the automated guided mobile unit reaching the delivery spot and disengage with the storage and retrieval shelf engaged therewith thereby dropping the storage and retrieval shelf at the delivery spot.

\* \* \* \* \*